(12) United States Patent
Romanufa et al.

(10) Patent No.: US 7,107,294 B2
(45) Date of Patent: Sep. 12, 2006

(54) METHOD AND APPARATUS FOR INTERRUPTING UPDATES TO A DATABASE TO PROVIDE READ-ONLY ACCESS

(75) Inventors: Keriley K. Romanufa, Scarborough (CA); Jeffrey J. Goss, Toronto (CA); Matthew A. Huras, Ajax (CA); Catherine S. McArthur, Uxbridge (CA); Dale M. McInnis, Aurora (CA); Michael J. Winer, Markham (CA); Roger L. Q. Zheng, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 10/752,026

(22) Filed: Jan. 7, 2004

(65) Prior Publication Data
US 2004/0181560 A1 Sep. 16, 2004

(30) Foreign Application Priority Data
Mar. 14, 2003 (CA) .................................... 2422176

(51) Int. Cl.
G06F 17/30 (2006.01)
(52) U.S. Cl. .......................... 707/202; 707/8; 707/204; 714/16
(58) Field of Classification Search ................ 707/1, 707/3, 8, 102, 202, 204; 714/15, 16, 19; 716/22
See application file for complete search history.

(56) References Cited

U.S. PATENT DOCUMENTS

| | | | | |
|---|---|---|---|---|
| 5,287,501 A * | 2/1994 | Lomet | ......................... | 707/202 |
| 5,317,731 A | 5/1994 | Dias et al. | | |
| 5,327,556 A * | 7/1994 | Mohan et al. | ................. | 707/8 |
| 5,455,944 A * | 10/1995 | Haderle et al. | ............. | 707/202 |
| 5,455,946 A * | 10/1995 | Mohan et al. | .............. | 707/202 |
| 5,485,608 A * | 1/1996 | Lomet et al. | ............... | 707/202 |
| 5,495,601 A | 2/1996 | Narang et al. | | |
| 5,524,205 A | 6/1996 | Lomet et al. | | |
| 5,845,292 A * | 12/1998 | Bohannon et al. | ........... | 707/202 |
| 5,850,507 A * | 12/1998 | Ngai et al. | ..................... | 714/16 |
| 6,092,066 A | 7/2000 | Ofek | | |
| 6,182,241 B1 * | 1/2001 | Ngai et al. | ..................... | 714/16 |
| 6,205,449 B1 * | 3/2001 | Rastogi et al. | .............. | 707/202 |
| 6,226,651 B1 * | 5/2001 | Masuda et al. | ............. | 707/202 |
| 6,295,610 B1 * | 9/2001 | Ganesh et al. | ................ | 714/19 |
| 6,493,826 B1 * | 12/2002 | Schofield et al. | ............. | 726/22 |

(Continued)

OTHER PUBLICATIONS

Bayer, R. et al., "Parallelism and Recovery in Database Systems", ACM Transactions on Database Systems, vol. 5, No. 2, Jun. 1980, pp. 139-156.*

(Continued)

Primary Examiner—Shahid Alam
(74) Attorney, Agent, or Firm—Andre Gibbs

(57) ABSTRACT

A method and system for suspending log-based updates to a database in a manner that permits resumption of log-based updating without reinitializing the database. The method and system thereby permit efficient alternation between a log-based update mode and a database access mode. Unplayed log records are protected as revisions of database pages at the time that the log-based update was suspended. This approach permits log-based updating to resume at the same point at which log-based updating was suspended. In order to ensure consistent data for access while in database access mode, a roll-back procedure creates consistent data pages that are used for access and discarded when log-based update resumes.

48 Claims, 5 Drawing Sheets

U.S. PATENT DOCUMENTS

| | | | |
|---|---|---|---|
| 6,567,928 B1* | 5/2003 | Lyle et al. | 714/15 |
| 6,651,073 B1* | 11/2003 | Lyle et al. | 707/202 |
| 6,950,834 B1* | 9/2005 | Huras et al. | 707/202 |
| 6,976,022 B1* | 12/2005 | Vemuri et al. | 707/8 |
| 6,981,004 B1* | 12/2005 | Ganesh et al. | 707/202 |
| 7,031,974 B1* | 4/2006 | Subramaniam | 707/102 |
| 7,065,537 B1* | 6/2006 | Cha et al. | 707/202 |
| 2004/0054643 A1* | 3/2004 | Vemuri et al. | 707/1 |
| 2004/0054644 A1* | 3/2004 | Ganesh et al. | 707/1 |

OTHER PUBLICATIONS

Mohan, C. et al., "ARIES: A Transaction Recovery Method Supporting Fine-Granularity Locking and Partial Rollbacks Using Write-Ahead Logging", ACM Transactions on Database Systems, vol. 17, No. 1, Mar. 1992, pp. 94-162.*

Spector, Alfred et al., "Distributed Transactions for Reliable Systems", ACM 1985, pp. 127-146.*

* cited by examiner

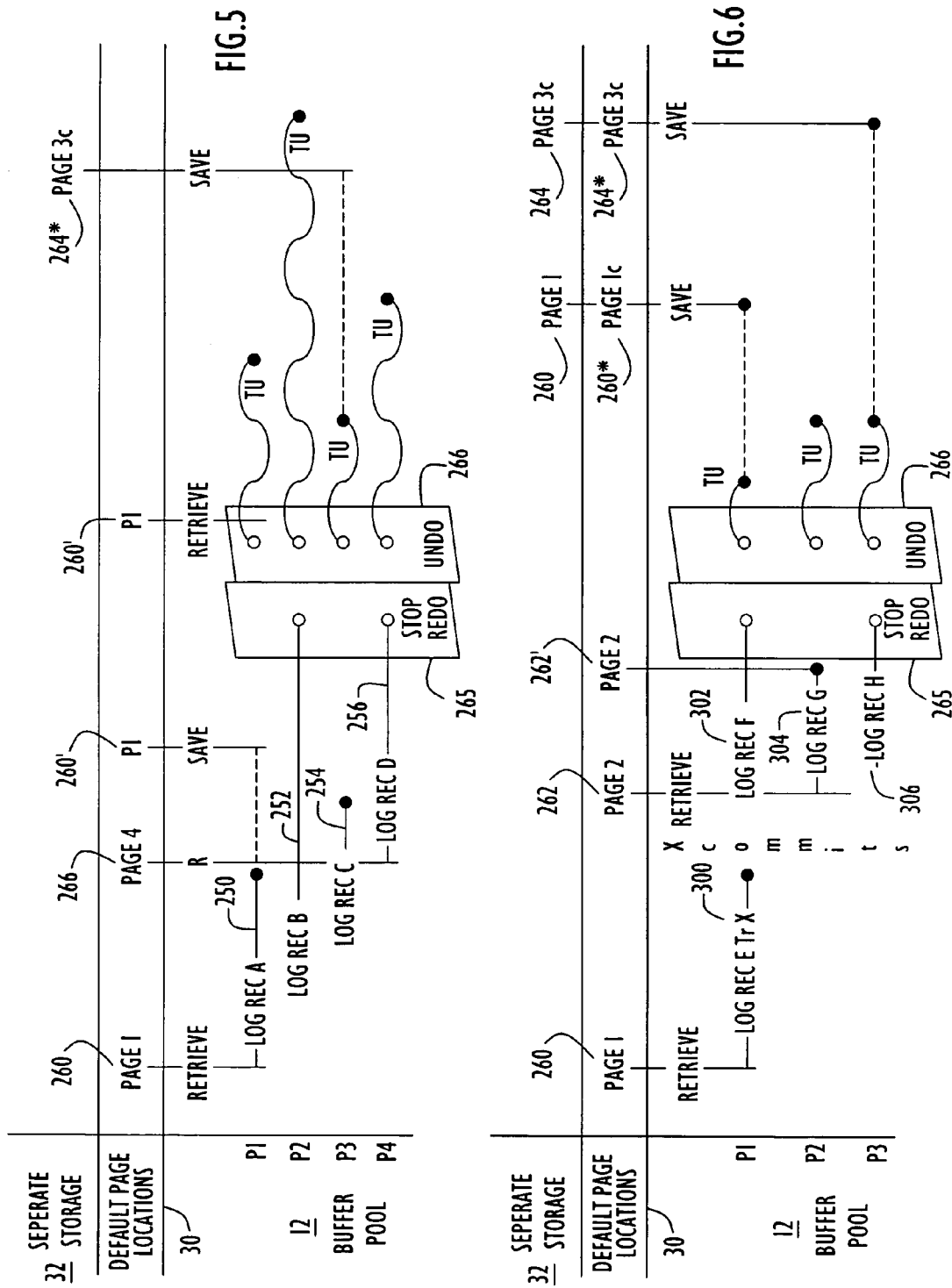

METHOD AND APPARATUS FOR INTERRUPTING UPDATES TO A DATABASE TO PROVIDE READ-ONLY ACCESS

BACKGROUND OF THE INVENTION

1. Field of the Invention

The invention relates to database access techniques, and in particular, to a method for providing read-only access to content of a database by suspending a log-based update mode in a manner that enables resumption.

2. Description of the Related Art

Availability of data in databases is of primary concern for database managers and users. The ability to access data for numerous purposes is becoming increasingly important, and there are increasing numbers of access techniques for retrieving useful information from databases.

Providing many users with access to a large database, requires equipment adapted to handle a volume of data input and output (I/O). The rate at which this I/O is provided and the number of concurrent access requests are major factors affecting a response time of the database system. Response time is another factor considered important by database managers and users.

A third concern of many database managers is disaster recovery. Many large database systems have disaster recovery systems in place to handle a primary database failure, and to provide a backup in case data is corrupted by human error, etc. Many of these disaster recovery systems require one or more backup copies of the database to be saved. FIG. 1 schematically illustrates a primary database server 10*a* having a buffer pool 12*a*, and disk storage 14*a* for holding the primary data; a secondary database server 10*b* having similar components, for storing the backup data; and a database management workstation 16, all interconnected by a packet network 18. The primary database server 10*a* may be a very busy entity having hundreds of users concurrently updating and retrieving data.

Generally the procedures for copying data from the primary disk storage 14*a* to the backup disk storage 14*b* is relatively expensive in terms of I/O, and in some cases, it requires exclusionary access to the primary database server 10*a*, resulting in a temporarily unavailable primary database. While known mirroring techniques greatly improve this process, duplication of the primary data is still a hardware-intensive process. Given the desire to minimize interruption of availability of the primary database server 10*a*, and occupation of the I/O hardware, it is therefore known to copy the data once, at a time=t, and then use logs of changes made to the primary database after time=t to update the backup database thereafter. The backup data is maintained concurrent with the primary data to within a guarded temporal lag. After the log of transactions effected at the primary database is created, it is forwarded to the backup database server 10*b*, in a procedure known as log shipping.

Log shipping is well known in the art. In accordance with common practice, every time the primary database is changed, the transaction is recorded in a log, which is usually stored for audit purposes, etc. Copies are made of this log, and shipped to the backup database server 10*b*. After a certain time delay, the logs are "replayed" at the backup database, unless processing is interrupted, as illustrated in FIG. 2.

As previously noted, each log record defines an action that has been applied to a database object at the primary database server 10*a*. A log record is retrieved (often in parallel with other log records), and is read (step 50). It is subsequently determined (in step 52) if the transaction of which the log record is a part is open. If the transaction is not open, a procedure for opening the transaction is executed (step 54). All pages that are included in the database object identified in the log record are retrieved from the default page locations to the buffer pool (unless they are currently instantiated at the buffer pool), in step 56. In step 58, the page(s) are retrieved and updated, so that the previous changes to the primary data are then made to the backup data. Once the log record replay is complete, it is determined, in step 60, whether the transaction is now ready to be committed, and if it is the transaction is completed (step 62). Actions necessary to record the effect of the log record are then effected, in step 64. In some embodiments a log sequence number (LSN) may be updated on the retrieved page(s) so that the page indicates a last completed transaction applied thereto, a completion log may be updated and the status of the page may otherwise be updated. If another record exists in the update log, this procedure is repeated by returning to step 50.

At any time during this replay process a stop command may be issued (step 66). The stop command may be issued in response to an error condition, a failure, a user input from the management workstation 16, or a programmed response. For example, if the log is empty, or a database manager issues a stop command, the process will halt. If the log is empty, the stop command will likely be issued after step 56, or after step 50, depending on program implementation.

These log record updates may be made in parallel, using known concurrent processing techniques. Consequently many (active) transactions may be ongoing at any given time. When a stop command is issued, in step 66, all active transactions are halted. Each of the active transactions is rolled-back (step 68), in a manner well known in the art. Basically, rolling back a transaction involves undoing changes to the pages that the transaction's log records affect.

As each transaction is either rolled-back or committed, the database after the rollback procedure of step 68, is in a consistent state. In step 70, abort logs and compensation logs are appended to the transaction log, overwriting any log records following a current log record. As will be appreciated by those skilled in the art, compensation log records are written to indicate the actions taken to undo the changes to the pages effected by the log records of active transactions. Abort records are written to indicate which log records have been stopped.

The backup database is now taken out of update mode, and can be accessed. It will be appreciated by those skilled in the art that the data in a consistent state can be used for many purposes. More particularly the backup data may be used for any procedure that requires a substantial amount of I/O resources, and therefore cannot be performed at the primary database server 10*a* without incurring unacceptable performance penalties. For example, generating month-end forms often requires collation of a substantial amount of data, as does creating charts and performing data manipulation operations to generate desired output. Month end forms are much more expeditiously generated using a copy of the database than by retrieving the data piecemeal, and reassembling the data at a workstation. Copies of databases in the consistent state may also be used for myriad database analysis procedures, for model and system testing and design, etc.

Once the work has been completed, or desired parts of the backup data has been copied to a third location where the work will be completed, the backup database is returned to service as the backup to the primary data. In accordance with known techniques, the current backup database is erased, and a new copy of the primary data is taken at time=t, and copied to the disk storage 14*b* (step 72). The records of transactions applied to the primary data after time=t are then forwarded to the backup database. The backup database may therefore be returned to the log-based update mode (step 74), and thus receive the records of transactions, and continues replaying the data as before.

As will be appreciated by those skilled in the art, recopying the primary data to the backup system is a time consuming operation that requires considerable I/O, resources (and network bandwidth when the secondary is not directly connected to the primary). Nonetheless, current highly robust methods for updating data do not terminate in a manner that permits the recommencement of the update process because versions of changed and undone pages that are needed for recovery, and the log records themselves, cannot be recovered. Accordingly there exists a need for a method and system for suspending a log-based update of a database, that permits resumption of the update process.

OBJECTS AND SUMMARY OF THE INVENTION

It is therefore an object of the invention to provide a method for suspending a log-based update of a database, that permits resumption of the update process.

It is a further object of the invention to provide a database system adapted to permit alternation between a log-based update mode and a database access mode.

According to an aspect of the present invention, there is provided, for a database management system, a method for temporarily suspending a log-based update of a database, the method including halting all transactions being processed from an update log on receipt of a stop command, initiating a transaction rollback to undo all uncommitted changes made to database pages in a current state by the halted transactions, to obtain a consistent set of the halted pages and protecting the update log, current and consistent versions of the rolled-back database pages, and update mode resume data from being overwritten, to permit the log-based updating to resume using the update log, the current versions of the rolled-back database pages, and the update mode resume data.

According to another aspect of the present invention, there is provided a database management system for temporarily suspending a log-based update of a database, the database management system including a module for halting all transactions being processed from an update log on receipt of a stop command; a module for initiating a transaction rollback to undo all uncommitted changes made to database pages in a current state by the halted transactions and to obtain a consistent set of the halted pages; and a module for protecting the update log, current and consistent versions of the rolled-back database pages, and update mode resume data from being overwritten, to permit the log-based updating to resume using the update log, the current versions of the rolled-back database pages, and the update mode resume data.

According to yet another aspect of the present invention, there is provided a computer program product having a computer readable medium tangibly embodying computer executable code for directing a database management system to temporarily suspend a log-based update of a database, the computer program product including code for halting all transactions being processed from an update log on receipt of a stop command, code for initiating a transaction rollback to undo all uncommitted changes made to database pages in a current state by the halted transactions and to obtain a consistent set of the halted pages, and code for protecting the update log, current and consistent versions of the rolled-back database pages, and update mode resume data from being overwritten, to permit the log-based updating to resume using the update log, the current versions of the rolled-back database pages, and the update mode resume data.

BRIEF DESCRIPTION OF THE DRAWINGS

Further features and advantages of the present invention will become apparent from the following detailed description, taken in combination with the appended drawings.

FIG. 5 illustrates a time chart of processes effected in accordance with the first embodiment of the invention.

FIG. 6 illustrates a time chart of processes effected in accordance with the second embodiment of the invention.

It will be noted that throughout the appended drawings, like features are identified by like reference numerals.

DETAILED DESCRIPTION OF THE PREFERRED EMBODIMENTS

Figure 1:
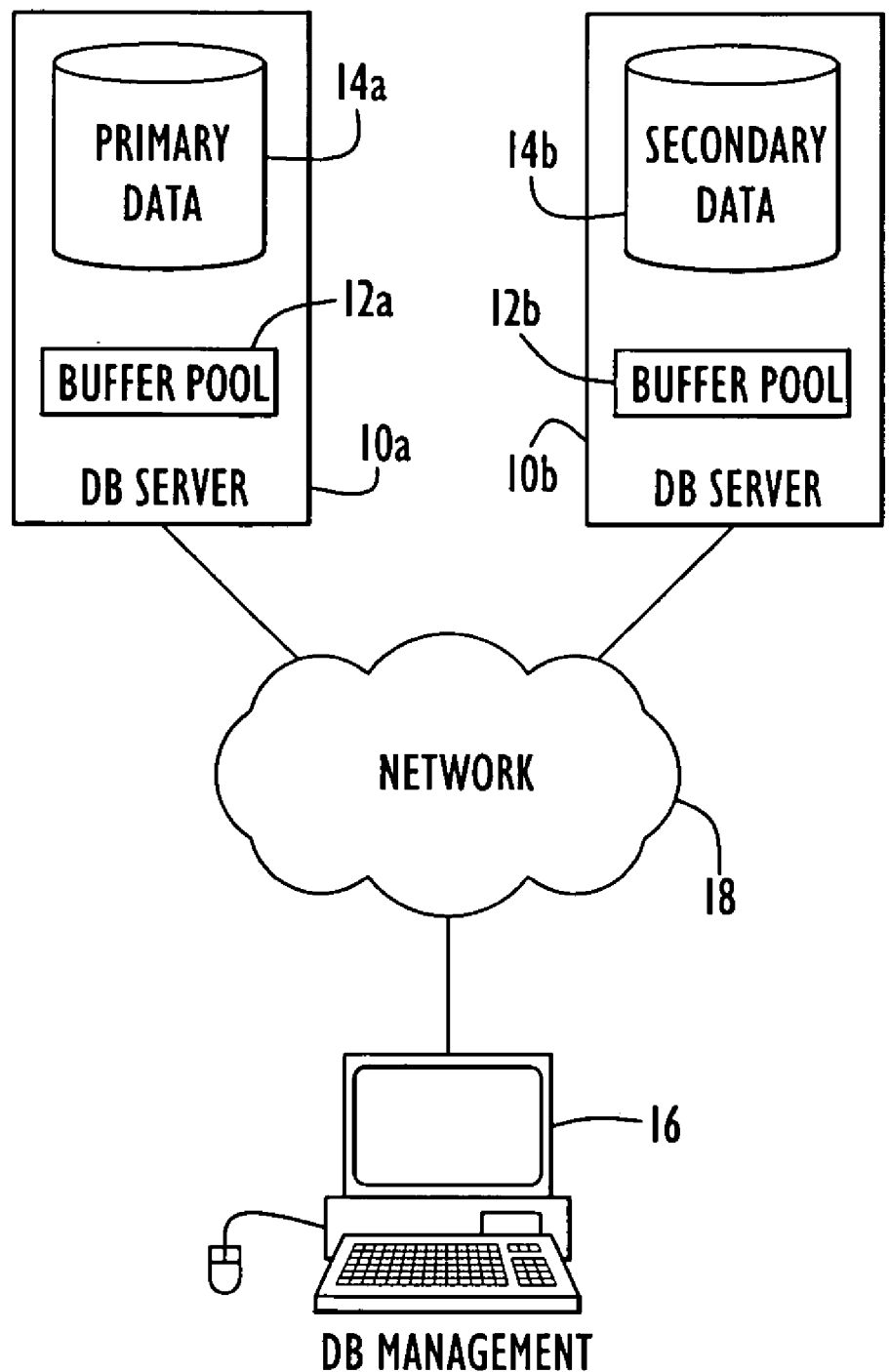
FIG. 1 is a block diagram that schematically illustrates a known embodiment of a networked database system.
Figure 2:
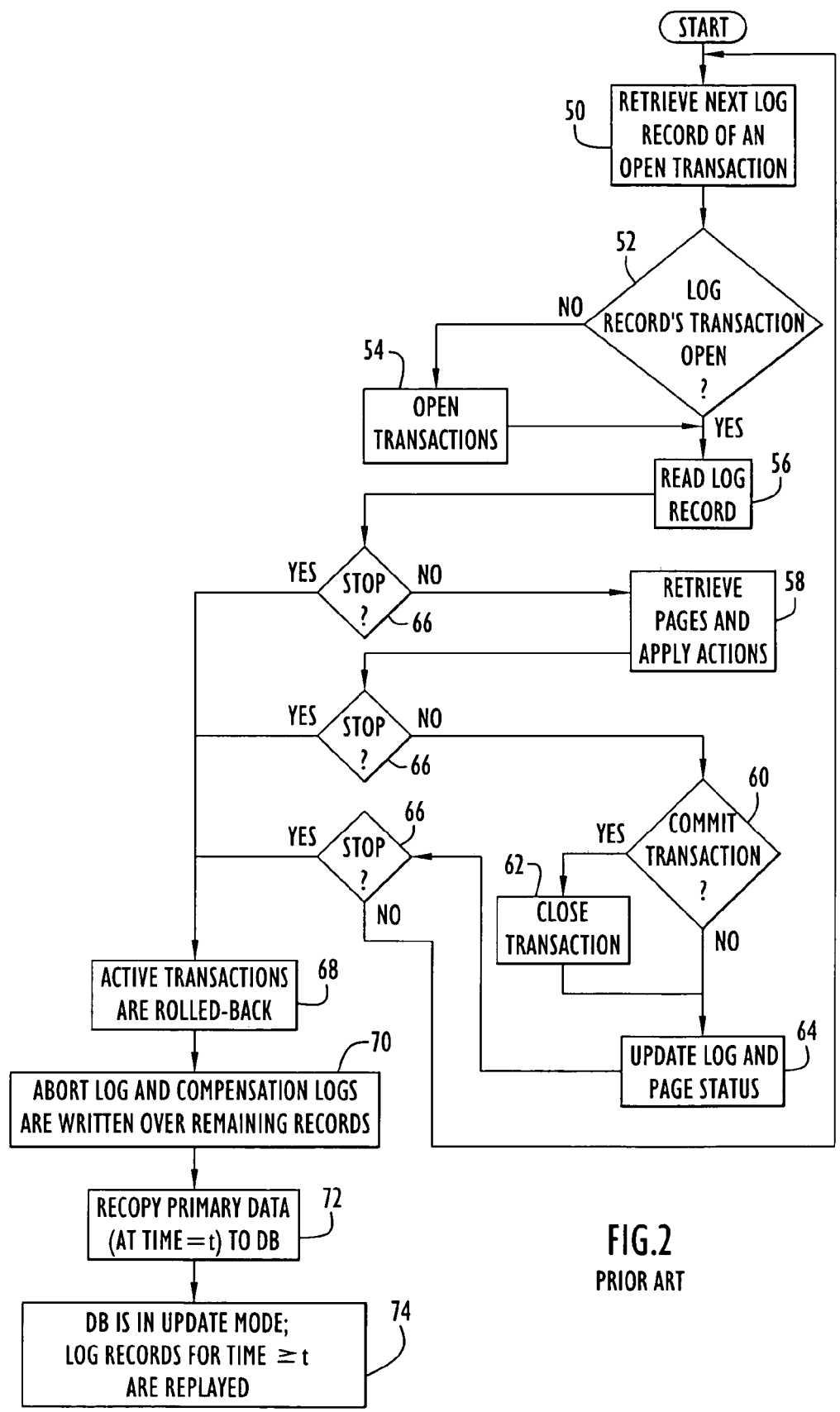
FIG. 2 illustrates principal steps involved in interrupting and restoring a log-based update mode in a known manner in the database system illustrated in FIG. 1.

The invention provides a method of suspending a log-based update process on a database, in order to provide access to a consistent set of pages of the database, while enabling the log-based update process to be resumed using the same log after the access is completed. The invention involves a method and apparatus for stopping a log-based update process in a manner that permits the log-based update process to be resumed from where it left off. Consequently, methods for alternating between the log-based update mode and an access mode are provided.

The present invention provides a mode of operation in which the pages (frames, blurbs, or other units of retrieval and storage of data) of the database are updated from a sequence of log records. Each log record represents an action on a database object (a record, frame, page, row, or other unit of action). A transaction comprises a set of log records (each log record can be said to have an associated transaction) and is an autonomous task in that all of the log records can be completed or all rolled-back independently of a state of any other transaction, without introducing any inconsistency in the database. As one transaction may comprise a plurality of log records that apply changes to a plurality of pages, an imposed serial order of execution of the log records within a transaction, concurrency limits, (such as limits on a size of the buffer pool, locks on data etc.) usually results in a period of time between when changes made to some pages have been completed, and when a corresponding transaction is committed.

In many embodiments, an efficient technique variously called "stealing" or "write ahead logging" is used to save changes made to a page by a transaction, before the transaction is committed. It is efficient for pages to only be retained in the buffer pool as long as they are needed. Consequently, when a transaction includes a plurality of actions affecting different pages, lock contention or buffer space limitations (etc.), or the imposed serial ordering of processing of these log records results in some of these pages being changed before others. These changed pages may then be resaved even though the transaction has not yet been committed, in accordance with the write ahead logging technique. This is efficient because it reduces occupancy of the buffer pool, which enhances concurrency using the limited data storage resources.

It is further advantageous to minimize use of busses that convey data between the buffer pool and disk storage (or other non-volatile storage medium for storing the data of the database), by keeping a version of a database page in the buffer pool after changes made by one transaction have completed, particularly if another transaction is waiting to access the database page, or it is likely that another transaction will soon require access to the page. In such embodiments, pages in the buffer pool are written to the default page locations whenever space is unavailable to download a requested database page (or other database object). This process is called "victimizing". The victimizing process ascertains which database page in the buffer pool has not been updated in a longest time. This is the page that is resaved (sent to disk) to the respective default page location, making room for the more immediately relevant database page(s). A victimized page is sent to disk regardless of whether a transaction that has amended it has committed, and a record of the state of the page is recorded in accordance with well known write ahead logging techniques. At checkpoints, the records are saved to disk so that a non-volatile store of the changes are recorded, and restart after a failure is possible, in a manner that is equally well known in the art.

The following examples assume the write ahead logging method wherein pages that a transaction has finished changing may be saved to default page locations in the database, but undo information is maintained to enable the undoing of these changes, in a manner known in the art. Any database system having a consistent version of pages that differs from a version needed to resume the log-based update mode, can also employ the invention, and the write ahead logging system is an illustrative embodiment of such a database system.

The access mode is, in many cases, a read-only mode. In some embodiments, "local write" access is permitted. As is well known in the art, a local write mode permits writing to only authorized pages, which in the present cases usually has to include only pages that are disjoint from the database pages that can be updated using the log records. If the update mode is used to keep the database in delayed synchrony with a primary database, none of the pages of the secondary database that are to be kept synchronous with primary counterparts can be changed without risk of corrupting the page data during normal operations. In such embodiments, the access mode naturally permits read-only access to these pages. However, other pages may be accessed for the purposes of storing intermediate results and tables for generating forms, reports, etc.

Figure 3:
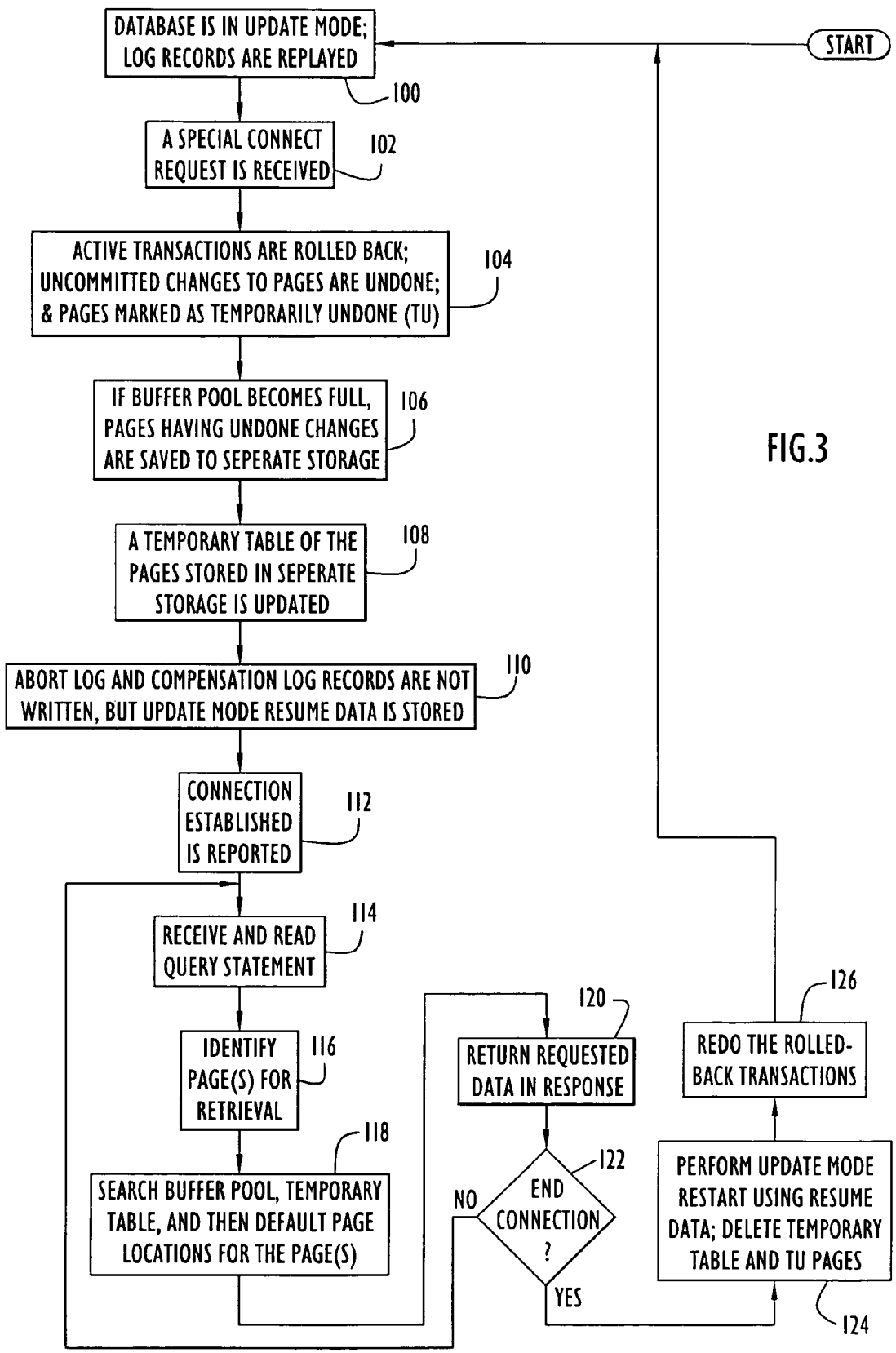
FIG. 3 illustrates principal steps involved in interrupting and restoring a log-based update mode in accordance with a first embodiment of the invention.

FIG. 3 schematically illustrates principal steps involved in alternating between the log-based update mode and the database access mode, in accordance with a first embodiment of the invention. The first embodiment shall be called the "quick return" embodiment herein, and is contrasted with a second embodiment that shall be called the "quick access" embodiment.

In step 100, the database is in the log-based update mode, and accordingly is replaying log records. In accordance with one aspect of the invention, a user may issue a special connect request, that a database control system is configured to interpret. In step 102, such a special connect request is received by the database control system. Since the database is in the log-based update mode, every active transaction log record replay is halted (step 104). The transactions that are halted are rolled-back to a state that is consistent with the remainder of the data. The roll-back of the transactions undoes changes made to versions of database pages during replay of respective log records that have been copied to the buffer pool, which is one embodiment of a working area where data can be stored while transactions are effected. In other embodiments, a cache memory or any other memory that can be used as a work area to facilitate data updates can be used. The versions of the database pages having undone changes are marked as "temporarily undone" (TU), to ensure that those versions of respective pages are not destroyed or overwritten. The TU pages (i.e. the versions of the database pages having undone changes) remain intact throughout the database access mode interlude, so that if a query of the respective page is made during the database access mode, the corresponding TU page is accessed to provide the response. The TU pages are marked to differentiate them from other pages that are in the buffer pool that were not affected by rolled-back transactions. Those other pages can be returned to respective default page locations with no loss of consistency during the access mode interlude, or when the log-based update mode resumes.

As rolling back transactions involves undoing changes to database pages, some of which may have already been written to disk, the roll-back requires returning the pages to the buffer pool. Of course the buffer pool is a limited resource, and the roll-back of transactions may exceed the buffer pool's capacity. Even if returning previously changed pages does not exceed the buffer pool's capacity, the capacity may be exceeded by read operations querying during the access mode.

In accordance with one embodiment of the invention (hereinafter the "buffer pool" embodiment), the impact of the problem is reduced by selecting a time when the playback of log records is halted. The TU pages are marked as "unflushable" so that a TU page cannot be deleted until the system is returned to the log-based update mode. To determine when to halt the log record replay, a number of uncommitted transaction pages is monitored, and when the number is below a predefined threshold, the playback is halted.

In accordance with a "quick return" embodiment, if the buffer pool becomes full, TU pages are saved to a separate storage (step 106), which may be database disk space that is not allocated to any database pages (i.e. separate from the default page locations). Each time a TU page is saved to disk to make space in the buffer pool, an entry in a temporary table of "victimized" TU pages is created (step 108). The entry provides all information required to identify the TU page, including an address of the separate storage at which the undone version is saved.

In accordance with the invention, in step 110, rather than writing abort and compensation log records over records subsequent to a current record in the update log, update mode resume data is stored. The update mode resume data provides all data required for the return to the log-based update mode. One way of collecting the update mode resume data is to change an address of an active write pointer from a current location in the log file to a separate storage. The abort and compensation logs, along with any other required data from the buffer pool, are used to compile the update mode resume data.

Once update mode resume data is compiled, and stored, and a consistent set of victimized TU pages are saved and referenced in the temporary table, the database is taken out of log-based update mode, and the access mode is entered with a response to the special connect request that indicates that a connection has been established (step 112). It is important to note that in some embodiments steps 106,108, 110 are repeated during the database access mode interlude, if buffer pool space is exhausted, in which case the update mode resume data may need to be updated, depending on the specific content and format of the update mode resume data.

Subsequently, the database receives a query, which it reads in step 114. Database pages referenced (step 116) by the query are retrieved to the buffer pool (step 118) by first searching the buffer pool to determine if the identified pages are already present; second searching the temporary table of victimized TU pages to see if the consistent version of the page is in the separate storage; and third, retrieving the pages from the respective default page locations if they are not found in either of the first two locations. The retrieved data is processed (as determined by applicable permissions), and returned in reply to the query (step 120). Steps 114–120 iterate until an end connection statement is received, as determined in step 122.

The database is then taken out of the database access mode, and returned to the log-based update mode, by performing an update mode restart using the update mode resume data (step 124). When restarting, the versions of the pages that are stored in the default page locations (current pages) are used and the procedure needs only redo the log records that had not already completed prior to being committed. The log-base update mode resumes (step 126) starting with pages that were being changed when the stop command was issued, in response to the special connect message. Thus at this point the consistent versions of the database pages are no longer of use, and so the temporary table of victimized pages, along with the TU pages may be deleted any time after the database access mode has been terminated.

In accordance with a "quick access" embodiment, substantially the same initial steps are performed. The database starts in a log-based update mode (step 200), receives the special connect request (step 202) and issues the stop command, marks the pages associated with aborted transactions as TU, and rolls back transactions accordingly (step 204). If the buffer pool becomes congested, and a TU page has to be victimized, the TU page is saved to the default page location after the default page is saved to a separate storage (step 206), such as the separate storage used to store the TU pages in the quick return embodiment. In order to prevent successive undo actions applied to a given page from saving the currently undone version to the separate storage, and then incorrectly saving the new undone page to the default page location, the TU page is marked. Accordingly if a next undo operation is applied to the given page, it will update the TU page in the default page location, but will not overwrite the default page saved to the separate storage.

As in the quick return embodiment, the compensation and abort logs are not written over current log records, but are rather suspended or written to a separate storage (step 208). The reply indicating that the connection is established, is likewise sent (step 210). In this embodiment, a temporary table of victimized TU pages is not required. This is because the database pages are all accessed in the usual manner, because the consistent versions (TU pages) are stored in respective default page locations. This is what expedites access.

The database control system processes and replies to queries in sequence while in the database access mode. It therefore receives and reads query statements (step 212), identifies page(s) that are to be retrieved (step 214), retrieves the pages in a manner well known in the art, and returns the responses (step 216). If another command is received, the procedure of replying is iterated; otherwise it is determined in step 218, that the special connection has been terminated. As will be appreciated by those skilled in the art, it may be desirable to permit multiple concurrent special request connections. If so, once the database has been placed in a consistent state, the stop, redo and undo commands are not applied when a second or subsequent special connect request is received. Instead, concurrent access is granted, and the return to the log-based update mode is delayed until all special connect request connections have been terminated.

When all special connect request connections have been terminated, the update mode is restarted (step 220). The update mode restart procedure in accordance with the present invention uses the update mode resume data to identify a set of operations required to return to the log-based update mode, including information about aborted transactions, states of completion of transactions, states of particular pages in the buffer pool, and those in the separate storage. Particular to the quick-access embodiment is the requirement to return each of the versions of the pages in the separate storage to respective default page locations from which they were copied. This step is not required in the quick-return embodiment, and consequently the quick-access embodiment is slower to return to the log-based update mode than is the quick-return embodiment. The rolled-back transactions are restarted where the changes were interrupted using the versions of pages (step 222) that are now in the default page locations.

FIG. 5 schematically illustrates timing of a sequence of events that occur when suspending a log-based update mode in accordance with the quick-access embodiment of the invention discussed above with reference to FIG. 3. In accordance with the quick-access embodiment, three data stores are used, a buffer pool 12 (generalized from FIG. 1), default page locations section 30 of a disk storage 14 (generalized from FIG. 1), and separate storage 32 that may occupy a portion of disk storage 14 that is not used for the default page locations section 30. It will be appreciated by those skilled in the art that in normal operation, the database data is normally stored in the default page locations section 30, and that there is normally extra space on the disk storage 14 that can be used for various other purposes known in the art.

As noted above, numerous transactions can be performed concurrently by many of today's database systems. This concurrency requires complex procedures for committing or rolling-back transactions when consistency must be restored by database control systems that control the processing of these transactions. In the example shown in FIG. 5, multiple concurrent transactions are performed on respective pages. Only one of the transactions is illustrated however. The illustrated transaction includes four log records (Log Rec A, B, C, D, referenced by numerals 250, 252, 254, 256, respectively). Further the database stores pages 1, 2, 3, & 4 in respective default page locations.

Log record A (250), requires a retrieval of page 1 from the default page location 260. Log records B (252) and C (254) are both started before log record A (250) is completed. When log record A (250) has been replayed, the amended page 1 (260') remains in the buffer pool. After some time page 1 (260') is victimized, despite the fact that the transaction it is associated with is still uncommitted. Log Record B (252) requires a change to page 2 (262) that was in the buffer pool when the log record B was played. Log record B (252) places a request for a lock on a content of page 2 (262), which is currently being used by a log record of another transaction (not shown). Consequently, log record B (252) is forced to wait until the page 2 (262) becomes available. After the lock is effective, replaying of the log record commences, but does not complete before a stop redo command 265 is received.

The replay of log record C (254) requires access to page 3 (264) that currently resides in the buffer pool. A status of such a page is not determined by the transaction. The page may have been changed any number of times previously. It could have been saved to disk and returned, and still have locks applied by ongoing uncommitted transactions, or it could have been block copied and not yet modified since retrieval. Log record C (254) is replayed and completes before the stop redo command 265 is issued. The replay of log record D (256) results in modifications to page 4 (266), which is retrieved from the default page location 30. When a stop redo command 265 is received, and the associated procedure is executed, the replay of log record D (256) is still modifying page 4 (266).

The stop redo command (265) halts all active transactions. In this example, the current transaction is halted because log records B (252), and D (256) have not completed. Halting the transaction requires halting the replay of those two log records. When in progress transactions are halted, the database pages stored at default page locations are inconsistent. The replay of some log records has updated some of the database pages before the replay of the other log records associated with respective transactions are completed or started. Some that have been changed by uncommitted transactions, for example page 1 (260') may have been saved in default page locations. All of the active transactions must be undone in order to ensure consistent versions (TU pages) of all database pages. Thus, rollback of transactions is effected pursuant to an undo command 266. Undoing log record A requires first retrieving page 1 (260) from its default page location. Log record C (254) is the first to be completely undone, followed by log records A, and D. In this example, log record B takes longest to be completely undone, and before it is undone, a page in the buffer pool 12 needs to be victimized and it is saved to separate storage, as explained above with reference to FIG. 3. Once undone, the undone pages are marked as TU. In accordance with the quick return embodiment, the consistent version of page 3 (264) i.e. page 3c (264*) is victimized, and accordingly the page 3c (264*) is saved to the separate storage 32. As described above, the temporary table of victimized TU pages is updated to enable access to their content during database access mode. At the end of the time illustrated, TU pages of pages 1, 2 and 4 all remain in the buffer pool 12.

As described above with reference to FIG. 3, in embodiments where the buffer pool 12 is large enough to support all of the pages of all of the active transactions, and still provide space required to permit access during the database access mode, the TU pages are marked as "unflushable" to prevent them from being over-written, and identifying a place in the logs required to restart the log-based update mode with the existing log may be all that is required to practice the invention. However, the undo command 266 may cause more pages to be returned to the buffer pool 12 than the buffer pool 12 can store. Consequently, in accordance with the quick-return embodiment, once the buffer pool 12 is full, TU pages that are cleared from the buffer pool 12 are saved to the separate storage 32.

Figure 4:
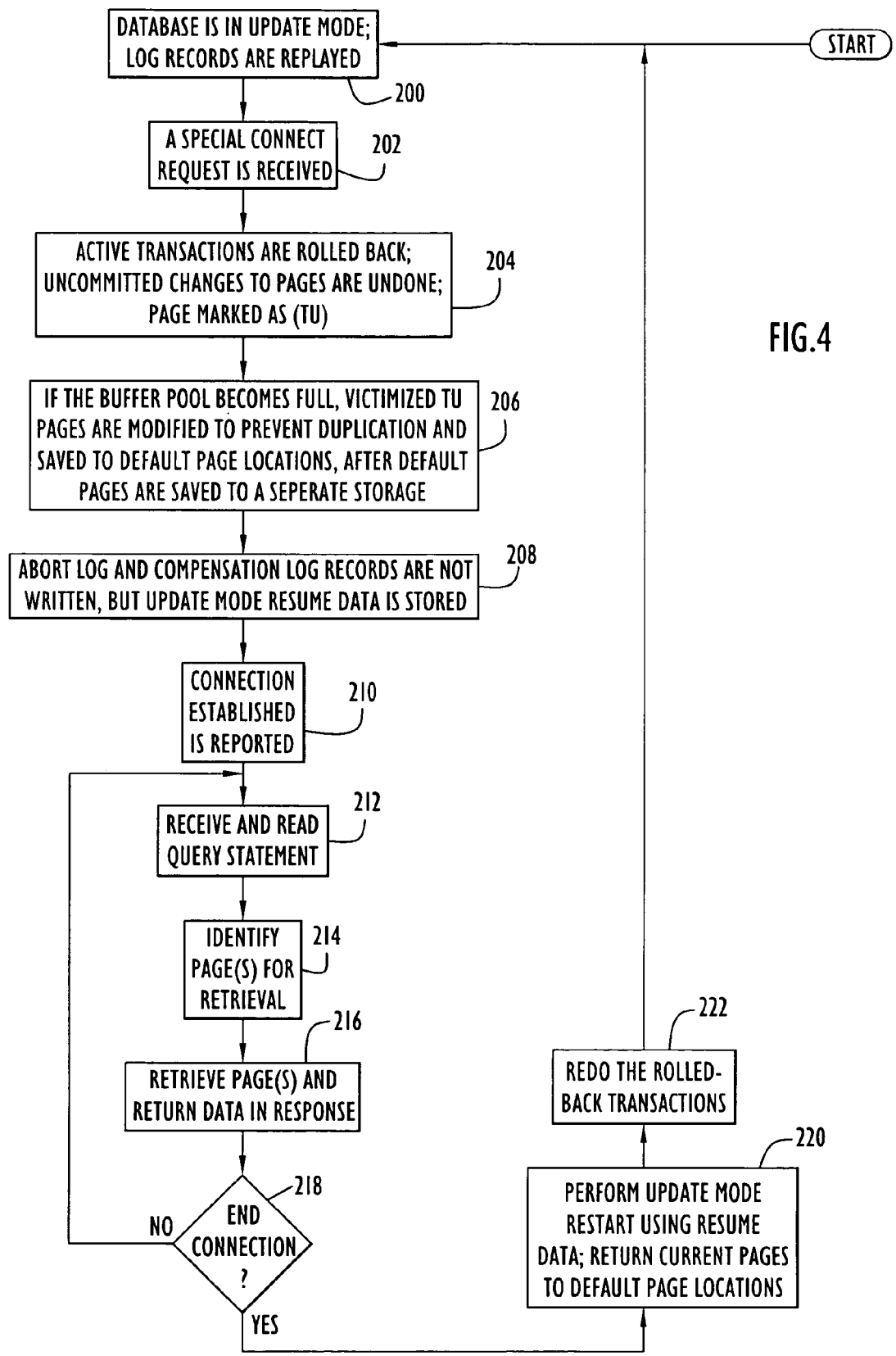
FIG. 4 illustrates principal steps involved in interrupting and restoring a log-based update mode in accordance with a second embodiment of the invention.

FIG. 6 schematically illustrates timing of actions involved in suspending a log-based update mode in substantially the same environment as illustrated in FIG. 5, but in accordance with the quick-access embodiment described above with reference to FIG. 4. The replay of log record E (300) retrieves page 1 (260), performs a set of actions, completes the transaction associated with Log record E (300) i.e. transaction X commits, yielding a modified page 1 (260'). Page 1 (260') is then locked by log record F 302, which does not complete before the stop redo command is received. Log records F (302), G (304) and H (306) are all associated with a common transaction. The replay of log record G (304) retrieves page 2 (262), replays to completion, yielding page 2 (262'). While replay of the log record H (306) is updating the page 3 (264) which was already in the buffer pool, the stop redo 265 command is received. The undo algorithm 266 is then executed and all log records of the interrupted transaction are rolled back, marked as TU, and stored in the buffer pool 12. In this example, pages in the buffer pool have to be victimized. Log records F, G and H are completely undone, returning the page 1 to the condition of page 1 (260'). Pages 2 and 3 are also undone. Each undone page is marked as TU.

Subsequently, in accordance with the quick-access embodiment, TU pages 1 (260*) and 3 (264*) are resaved to respective default page locations, after the corresponding pages in the default page locations are saved to the separate storage 32. As was described above, the TU pages 1 and 3 are identifiable as undone pages so that if other log records that affect pages 1 and 3 are undone, then the procedure for undoing retrieves the page(s) from the default page location, changes and resave the page(s) to the default page location, without over-writing the original saved in the separate storage 32.

Determining at least an estimate of an amount of memory required to store database pages associated with currently replaying log records can be useful for determining when to respond to a stop redo command in any of the above-described embodiments of the inventions. There are many different values that can be monitored or examined to obtain an estimate of the free memory required to halt replay at any given moment. Responding to a stop command when the estimate is determined to conform with a predefined constraint can improve performance but generally results in a time lag in the response to the special connection request.

Although the invention has been described with reference to rollforward processing used in database systems employing the write ahead logging, and having locks at sub-page granularity, the invention is in no way limited to database systems of this type.

The embodiments of the invention described above are therefore intended to be exemplary only, and the scope of the invention is intended to be limited solely by the scope of the appended claims.

What is claimed is:

1. A method of temporarily suspending and resuming a log-based update of a database to enable database access during said log-based update, the method comprising:

(a) halting transactions being processed from an update log upon receipt of a stop command to suspend said log-based update;
(b) rolling back transactions to undo uncommitted changes made to database pages by the halted transactions, thereby obtaining a consistent set of halted pages and enabling access of data during said suspended update; and
(c) protecting the update log, the current and consistent versions of the rolled-back database pages and update mode resume data from being overwritten during said suspended update, and unprotecting the update log and using the update log, the current versions of the rolled-back database pages and the update mode resume data to resume said log-based update after said access.

2. The method of claim 1, wherein step (c) further includes:
protecting unprocessed records in the update log file from being overwritten by compensation and abort logs.

3. The method of claim 2, wherein step (c) further includes:
saving the compensation and abort log records to a storage separate from a storage where the update log is stored to ensure that the update log is not overwritten.

4. The method of claim 2, wherein step (c) further includes:
assembling update mode resume data with data retrieved from the abort and compensation logs to provide state of page and transaction information.

5. The method of claim 3, wherein step (c) further includes:
changing an address of an active write pointer to point to the separate storage prior to saving the compensation and abort log records.

6. The method of claim 1, wherein step (c) further includes:
marking the consistent versions of database pages with undone changes as temporarily undone.

7. The method of claim 1, wherein step (c) further includes:
ensuring no consistent version of a database page is victimized.

8. The method of claim 1, wherein step (c) further includes:
saving the consistent version of a protected database page to a storage that is separate from a default page location associated with the database page in response to determining a need to victimize the consistent version of the database page.

9. The method of claim 8, wherein step (c) further includes:
adding an entry to a temporary table of victimized pages that have been saved to the separate storage, wherein the entry includes an identifier of the database page associated with the consistent version and a pointer to a location of the consistent database page within the separate storage, thereby providing an expedited lookup index for the consistent version of the database page until the database is returned to a log-based update mode.

10. The method of claim 1, wherein step (c) further includes:
copying a current version of a corresponding database page from a corresponding default page location to a separate storage and saving a consistent version of the database page to said corresponding default page location in response to determining the consistent page is to be victimized.

11. The method of claim 10, wherein step (c) further includes:
inserting an identifier into the consistent database page at the corresponding default page location to prevent the current version of the database page from being overwritten.

12. The method of claim 10, wherein step (c) further includes:
returning the current version of the victimized database page to the corresponding default page location in response to completing a database access mode and resuming a log-based update mode.

13. The method of claim 1, wherein step (a) further includes:
halting a forward recovery of log records from a primary database.

14. The method of claim 13, wherein step (a) further includes:
receiving a constraint defining a condition for initiating the halting of the forward recovery.

15. The method of claim 14, wherein step (a) further includes:
determining an estimate of an amount of memory required to store database pages associated with currently active transactions; and
performing the halting of forward recovery when the estimate is determined to conform with the specified constraint.

16. The method of claim 13, wherein step (a) further includes:
receiving a special connect request message from a management workstation.

17. A computer system for temporarily suspending and resuming a log-based update of a database to enable database access during said log-based update, the system comprising:
a transaction-control module to halt transactions being processed from an update log upon receipt of a stop command to suspend said log-based update;
a rollback module to roll back transactions to undo uncommitted changes made to database pages by the halted transactions, thereby obtaining a consistent set of halted pages and enabling access of data during said suspended update; and
a data-control module to protect the update log, the current and consistent versions of the rolled-back database pages and update mode resume data from being overwritten during said suspended update, and to unprotect the update log and using use the update log, the current versions of the rolled-back database pages and the update mode resume data to resume said log-based update after said access.

18. The system of claim 17, wherein the data-control module includes:
a transaction-integrity module to protect unprocessed records in the update log file from being overwritten by compensation and abort logs.

19. The system of claim 18, wherein the transaction-integrity module includes:
a storage module to save the compensation and abort log records to a storage separate from a storage where the update log is stored to ensure that the update log is not overwritten.

20. The system of claim 18, wherein the transaction-integrity module includes:
a resume-data module to assemble update mode resume data with data retrieved from the abort and compensation logs to provide state of page and transaction information.

21. The system of claim 19, wherein the transaction-integrity module includes:
a storage-address module to change an address of an active write pointer to point to the separate storage prior to saving the compensation and abort log records.

22. The system of claim 17, wherein the data-control module includes:
an undone-control module to mark the consistent versions of database pages with undone changes as temporarily undone.

23. The system of claim 17, wherein the data-control module includes:
a victimized-control module to ensure no consistent version of a database page is victimized.

24. The system of claim 17, wherein the data-control module includes:
a data-integrity module to save the consistent version of a protected database page to a storage that is separate from a default page location associated with the database page in response to determining a need to victimize the consistent version of the database page.

25. The system of claim 24, wherein the data-integrity module includes:
an index module to add an entry to a temporary table of victimized pages that have been saved to the separate storage, wherein the entry includes an identifier of the database page associated with the consistent version and a pointer to a location of the consistent database page within the separate storage, thereby providing an expedited lookup index for the consistent version of the database page until the database is returned to a log-based update mode.

26. The system of claim 17, wherein the data-control module includes:
a page-swap module to copy a current version of a corresponding database page from a corresponding default page location to a separate storage and to save a consistent version of the database page to said corresponding default page location in response to determining the consistent page is to be victimized.

27. The system of claim 26, wherein the page-swap module includes:
a marking module to insert an identifier into the consistent database page at the corresponding default page location to prevent the current version of the database page from being over-written.

28. The system of claim 26, wherein the data-control module includes:
a resumption module to return the current version of the victimized database page to the corresponding default page location in response to completing a database access mode and resuming a log-based update mode.

29. The system of claim 17, wherein the transaction-control module includes:
a stop module to halt a forward recovery of log records from a primary database.

30. The system of claim 29, wherein the stop module includes:
a constraint module to receive a constraint defining a condition for initiating the halting of the forward recovery.

31. The system of claim 30, wherein the constraint module includes:
an estimate module to determine an estimate of an amount of memory required to store database pages associated with currently active transactions; and
a threshold module to perform the halting of forward recovery when the estimate is determined to conform with the specified constraint.

32. The system of claim 29, wherein the transaction-control module includes:
a connection module to receive a special connect request message from a management workstation.

33. A program product apparatus having a computer readable storage medium with computer program logic recorded thereon for directing a database management system to temporarily suspend and resume a log-based update of a database to enable database access during said log-based update, said program product apparatus comprising:
a transaction-control module to halt transactions being processed from an update log upon receipt of a stop command to susDend said log-based update;
a rollback module to roll back transactions to undo uncommitted changes made to database pages by the halted transactions, thereby obtaining a consistent set of halted pages and enabling access of data during said suspended update; and
a data-control module to protect the update log, the current and consistent versions of the rolled-back database pages and update mode resume data from being overwritten during said suspended update, and to unprotect the update log and use the update log, the current versions of the rolled-back database pages and the update mode resume data to resume said log-based update after said access.

34. The program product of claim 33, wherein the data-control module includes:
a transaction-integrity module to protect unprocessed records in the update log file from being overwritten by compensation and abort logs.

35. The program product of claim 34, wherein the transaction-integrity module includes:
a storage module to save the compensation and abort log records to a storage separate from a storage where the update log is stored to ensure that the update log is not overwritten.

36. The program product of claim 34, wherein the transaction-integrity module includes:
a resume-data module to assemble update mode resume data with data retrieved from the abort and compensation logs to provide state of page and transaction information.

37. The program product of claim 35, wherein the transaction-integrity module includes:
a storage-address module to change an address of an active write pointer to point to the separate storage prior to saving the compensation and abort log records.

38. The program product of claim 33, wherein the data-control module includes:
an undone-control module to mark the consistent versions of database pages with undone changes as temporarily undone.

39. The program product of claim 33, wherein the data-control module includes:
a victimized-control module to ensure no consistent version of a database page is victimized.

40. The program product of claim 33, wherein the data-control module includes:

a data-integrity module to save the consistent version of a protected database page to a storage that is separate from a default page location associated with the database page in response to determining a need to victimize the consistent version of the database page.

41. The program product of claim 40, wherein the data-integrity module includes:
an index module to add an entry to a temporary table of victimized pages that have been saved to the separate storage, wherein the entry includes an identifier of the database page associated with the consistent version and a pointer to a location of the consistent database page within the separate storage, thereby providing an expedited lookup index for the consistent version of the database page until the database is returned to a log-based update mode.

42. The program product of claim 33, wherein the data-control module includes:
a page-swap module to copy a current version of a corresponding database page from a corresponding default page location to a separate storage and to save a consistent version of the database page to said corresponding default page location in response to determining the consistent page is to be victimized.

43. The program product of claim 42, wherein the page-swap module includes:
a marking module to insert an identifier into the consistent database page at the corresponding default page location to prevent the current version of the database page from being over-written.

44. The program product of claim 42, wherein the data-control module includes:
a resumption module to return the current version of the victimized database page to the corresponding default page location in response to completing a database access mode and resuming a log-based update mode.

45. The program product of claim 33, wherein the transaction-control module includes:
a stop module to halt a forward recovery of log records from a primary database.

46. The program product of claim 45, wherein the stop module includes:
a constraint module to receive a constraint defining a condition for initiating the halting of the forward recovery.

47. The program product of claim 46, wherein the constraint module includes:
an estimate module to determine an estimate of an amount of memory required to store database pages associated with currently active transactions; and
a threshold module to perform the halting of forward recovery when the estimate is determined to conform with the specified constraint.

48. The program product of claim 45, wherein the transaction-control module includes:
a connection module to receive a special connect request message from a management workstation.

* * * * *